Aug. 31, 1948.    H. F. BAKEWELL    2,448,245
GRINDING FIXTURE
Filed Jan. 2, 1945    6 Sheets-Sheet 1

INVENTOR.
HARDING F. BAKEWELL,
BY
ATTORNEY.

Aug. 31, 1948.   H. F. BAKEWELL   2,448,245
GRINDING FIXTURE
Filed Jan. 2, 1945   6 Sheets-Sheet 2

INVENTOR.
HARDING F. BAKEWELL,
BY
ATTORNEY.

HARDING F. BAKEWELL,
INVENTOR.

BY *Alfred W. Knight*
ATTORNEY.

Aug. 31, 1948.                    H. F. BAKEWELL                    2,448,245
                                  GRINDING FIXTURE
Filed Jan. 2, 1945                                              6 Sheets-Sheet 4

HARDING F. BAKEWELL,
INVENTOR.

BY
ATTORNEY.

Aug. 31, 1948.                    H. F. BAKEWELL                    2,448,245
                                  GRINDING FIXTURE
Filed Jan. 2, 1945                                                6 Sheets-Sheet 6

Harding F. Bakewell,
INVENTOR.

BY
                ATTORNEY.

Patented Aug. 31, 1948

2,448,245

UNITED STATES PATENT OFFICE 2,448,245

GRINDING FIXTURE

Harding F. Bakewell, San Marino, Calif.

Application January 2, 1945, Serial No. 571,043

20 Claims. (Cl. 51—95)

This application relates to the art of machine tools, and pertains particularly to a machine tool adapted to function as a fixture for grinding taps, drills, reamers and the like. More particularly, the device is adapted to produce ground surfaces having controlled but varied dimensions (in a radial sense) in a more accurate manner than has heretofore been considered possible in a device of this character.

In the grinding of rotative cutting tools having a plurality of circumferentially spaced cutting edges, the device of the present invention provides a particularly high degree of accuracy in the formation of such cutting edges, whereby the cutting tool is caused to have a high degree of accuracy in performance of its intended work.

Taking thread-cutting tools, such as taps, for example, the formation of the thread-portions of the tool in the manufacture of the tap is a rather simple matter, modern manufacturing methods being entirely adequate; the formation of the cutting edges at the chamfered cutting end, however, is an entirely different matter where a precisely-operating tool is desired. In order for the several cutting edges to accomplish the same amount of work (and thus produce a thread which is dimensionally precise), these cutting edges must be established upon the same "cutting circle" or, more properly stated, the several cutting edges should be such as to define the same surface of revolution when the tool is rotated without translation about its axis of rotation. In addition, it is necessary to provide each cutting edge with a "back relief," and the back relief for the several cutting edges should preferably be uniform. Furthermore, the cutting edge of each land of the tool should be positioned the same number of degrees apart in order to cut properly, i. e., a four flute tap or reamer should have its respective cutting edges at exactly 90° from one another; a five flute tool 72°; a six flute tool 60°, et cetera. In the case of reamers, the cutting edges should similarly be ground in such manner that each performs the same amount of work, which can be accomplished only if the cutting edges are formed on the same cutting circle and indexed at the correct angular spacing relative to flute and chamfer. On specific tests which I have conducted upon new reamers, made by one of the most highly regarded manufacturers in the United States of America, as few as three teeth on eight-tooth reamers were found to be doing all of the cutting, which illustrates the difficulty which even the best manufacturers have in the formation of these tools with the best equipment heretofore available. When a dulled or broken tap or reamer is re-sharpened in the shop, the difficulty is often increased instead of being eliminated or lessened.

The grinding fixture of the present invention is characterized by the provision of a workholder adapted to receive the tap, drill, reamer or the like and hold it accurately for rotation about a given axis concentric with the axis of rotation of the tool in use, together with a grinding device arranged in position to engage the desired portion of the work in the work-holder, and means for producing a metered translatory movement between the work and the grinding means while rotating the work through a definite angle and maintaining the work alined on said given axis. The concurrent rotation of the work and the relative translatory movement of the work and grinder, both of which movements are controlled in extent and effected in precisely timed relation to one another through the agency of a single operating member, whereby successive operations upon the several cutting edges of a tool are substantially identical and a uniform result is obtained upon the tool as a whole.

One of the principal objects of the invention is to provide a grinding fixture of the character described, in which the relative translatory movement between the work and the grinding element is effected by hydraulic means, providing an almost infinite variation in the extent of translatory movement effected during a prescribed angular rotation of the work, under optimum control of the operator, and in which such hydraulic means is actuated by means of a single lobed cam member which is required to make a complete revolution for each translatory movement and a uniform repetition of the translatory movement is thereby effected throughout successive angular rotations of the work.

A further object of the invention is to provide a grinding fixture adapted for operation upon a multiple-flute tool, in which provision is made for positive angular advancement of the tool in increments of one flute, and for conducting a grinding operation upon the tool during each increment of movement.

A further object of the invention is to provide for the adjustment of the fixture for the grinding of a fluted tool of substantially any number of flutes, wherein the desired identical grinding operation on each cutting edge of the tool is provided by a single lobe cam operated hydraulic pressure means, and the multiplicity of cutting edges are successively subjected to grinding at the desired rotational spacing by the use of a change gear system of the necessary ratio, and the angular relationship of the cutting edges is so established that the several cutting edges are accurately disposed on the same cutting circle and accurately arranged at the same angular separation.

According to a preferred embodiment of the invention, the hydraulic operating means is provided with a variable-stroke control means whereby substantially any desired value of translatory movement is secured for a given rotational movement in the work-holder.

Other objects and features of the invention will be brought out in the ensuing description of certain illustrative embodiments thereof, or will be apparent from such description. These embodiments are shown in the accompanying drawings forming a part of this application, in which:

The device of the present invention may comprise a frame portion 1 pivotally mounted on a base 2 which is adapted to be mounted on the work table, machine bed or the like. The frame portion 1 is provided with a cylindrical bore 3 extending in a longitudinal direction, and carrying a rotatable spindle 4. The spindle 4 may be tubular in form and carry a collet chuck 5 or the like at its forward end to constitute a workholder. The rearward end of the spindle 4 is preferably provided with a driven gear 6 which may be secured in place through the agency of a lock collar 7 threadedly engaging the rearward end of the spindle. The spindle 4, in this embodiment of the device, is mounted for longitudinal sliding movement along the axis of rotation within the bore 3, said spindle being adapted for forward movement through the agency of hydraulic means hereinafter described and I prefer to provide for retraction of this spindle through the agency of a retracting spring 8, the rearward end of which may bear against the flange of the gear 6 and the forward end of which may bear against a flanged sleeve 9 mounted in a cylindrical recess 11 in the frame portion 1 concentric with the cylindrical bore 3. For the purpose of assembly, the flanged sleeve 9 may be retained in place through the agency of a retaining sleeve 12 which is in turn held in place by a rear gear case portion 13. The gear case portion 13 is provided with a gear case cover 14 which is hingedly mounted to the frame portion of the device as at 14a.

In order to provide for forward movement of the spindle 4 an expansion cylinder 15 is provided, concentric with the spindle 4, into which the hydraulic fluid may be introduced. Within the expansion cylinder 15 I provide a forward packing member 16 disposed against a rearwardly facing shoulder 17 on the spindle 4, a rearward packing 18 which may bear against the forward face of the flanged sleeve 9, and a placement spring 19 adapted to retain the packing members 16 and 18 in seating engagement with the respective adjacent seating faces.

A fluid communicating passage 21 is provided leading from expansion cylinder 15 to a pump 22 which acts to expand the cylinder 15 through fluid displacement. The pump 22 is provided with a spring biased pump plunger 22a which is biased upwardly into operative association with a pump operating cam 23 carried on a cam shaft 24 journaled as at 25 in frame 1. The cam shaft 24 is extended rearwardly and on a rearward projection 26 thereof I provide certain operating gear means hereinafter described, together with a square end 27 which is engaged by an operating handle 28 during operation of the device.

Between the pump plunger 22a and the pump operating cam 23 I provide a variable stroke link means 31 comprising a cam follower 32 pivotally mounted on the frame 1 and having its free end in position to engage the cam surface of the cam 23, a connecting idler 33 and a piston or plunger follower 34. The plunger follower 34 is pivotally secured to the frame 1 as at 35, and the connecting idler 33 is pivotally mounted on an adjusting link 36 which is pivotally mounted at its rearward end at 37 upon the head 38 of an adjustment screw 39 mounted in a guide barrel 41. The adjustment screw 39 extends into a threaded adjustment sleeve 42 which extends through a guide collar 43 and terminates in an adjustment knob 44.

Figure 1:
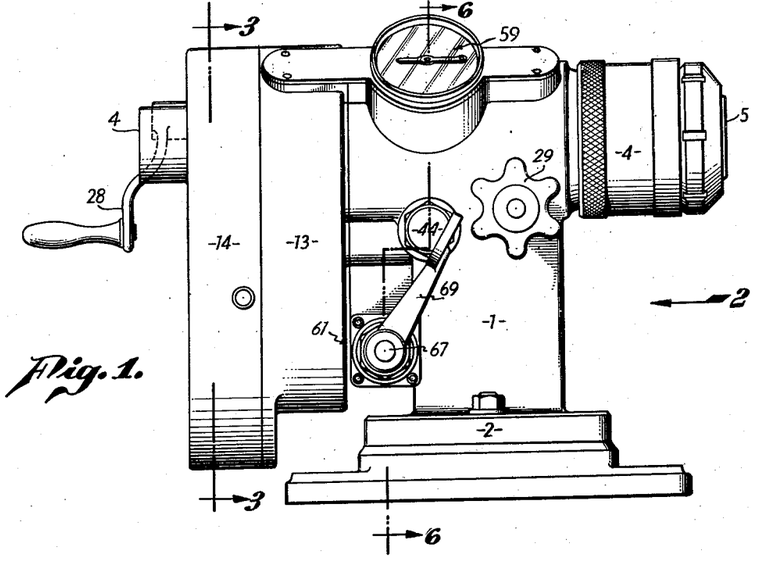
Fig. 1 is a side elevation of a grinding fixture according to this invention, with the grinding element omitted.
Figure 2:
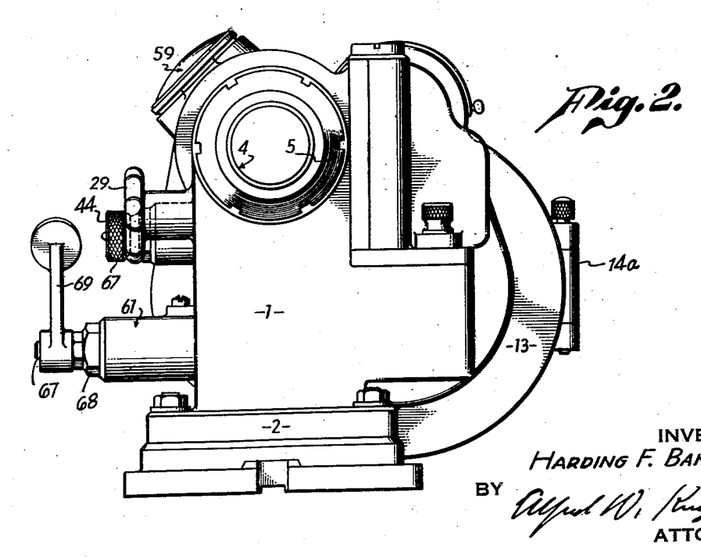
Fig. 2 is a front elevation thereof, as taken in the direction indicated by the arrow 2 in Fig. 1.
Figure 3:
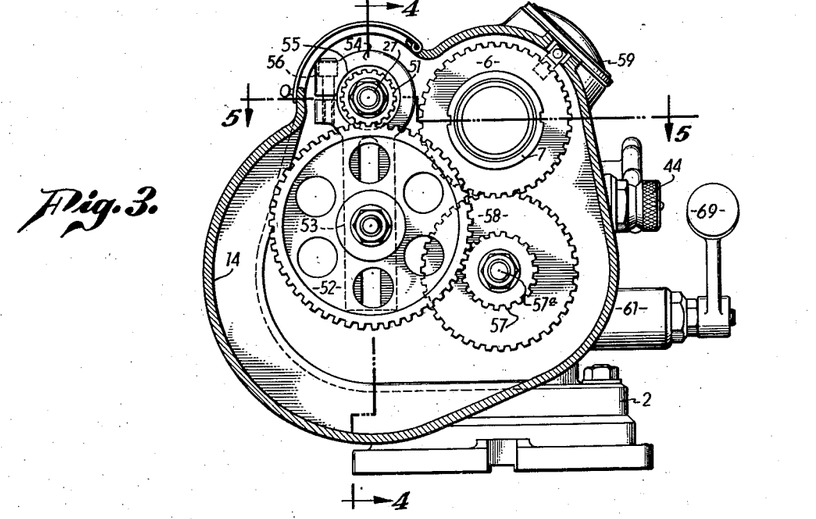
Fig. 3 is a transverse sectional elevation, taken on line 3—3 in Fig. 1.
Figure 4:
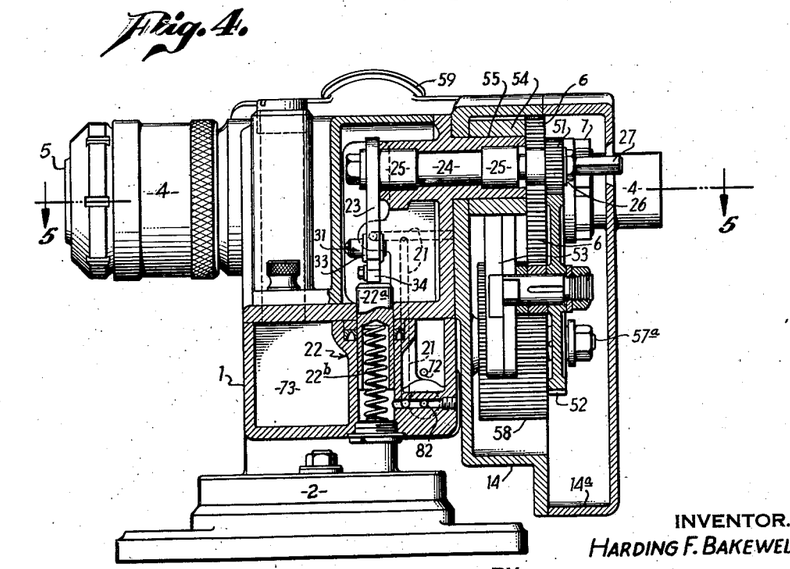
Fig. 4 is a partly sectional longitudinal view of the structure, as taken on line 4—4 in Fig. 3.
Figure 5:
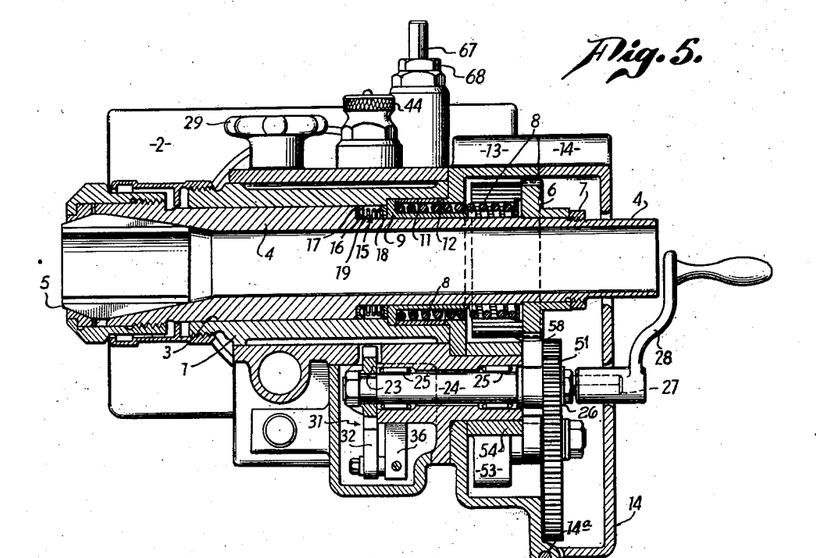
Fig. 5 is a partly sectional plan view of the device, as taken on lines 5—5 in Figs. 3 and 4.

In order to provide the required timed relation between the translatory and rotational movements which are produced in the device, I may provide a gear train connecting the cam shaft 24 (which operates the pump cam gear 23) to the spindle 4 on which the work-holder is provided. Furthermore, in view of the fact that in one case the operator will be concerned with grinding a two flute tap and in another case with grinding a four flute tap, for example, I preferably make this timed-operation connection of a change gear type so that any desired relation between the rotation of cam shaft 24 and the spindle 4 may be secured. For this purpose I may provide a cam gear 51 secured to the rearward projection 26 of the cam shaft 24, a countershaft gear 52 carried on a countershaft arm 53 provided with a clamp portion 54 rotatably mounted on a cylindrical extension 55 of the frame 1 and adapted to be locked in any desired rotated position through the agency of a set screw or the like 56. Meshing with the counter shaft gear 52 I provide a replaceable stud gear 57 mounted on a fixed stud shaft 57a, together with a permanent stud gear 58 meshing with the driven gear 6 on the spindle 4. The replaceable and permanent stud gears 57 and 58 will be provided with interlocking means constraining these two gears to concurrent rotation. The permanent stud gear 58 may carry the same number of teeth as the spindle gear 6, whereby substitution of various gears for the gears 51 and 57 will provide a large range of gear ratios between the cam shaft 24 and the spindle 4. I preferably arrange the mounting of the gears 51 and 53 on their respective shafts in such manner that they may be placed in the position of Figs. 3 and 4, with the cam gear 51 meshing with countershaft gear 52 and it in turn meshing with the removable stud gear 57, or, alternatively, in a position such that the countershaft gear 52 may mesh directly with the permanent stud gear 58, which requires that the gears 51 and 52 be moved forwardly upon their respective shafts. The permanent stud gear 58 is preferably formed with considerable axial length so that the spindle gear 6 meshing therewith may slide longitudinally with the spindle 4 and maintain its meshing engagement with the gear 58. This relative arrangement of parts is more particularly illustrated in Fig. 4.

It will be appreciated that some arrangement is desirable for the purpose of advancing the spindle 4 to a desired initial position to start a particular grinding operation on a tool held in the work-holder or collet chuck 5, and such indexing means may be provided as indicated at 61. This construction may comprise a pump barrel 62 provided with a pump plunger 63 slidably mounted within the barrel 62 and defining therewith a pump chamber 64. The pump plunger 63 is provided with an actuating cam 65 slidably mounted within the barrel 62 and a pump operating cam 66 rotatably mounted within the pump barrel upon a shaft 67 provided with a packing gland 68 and an operating lever 69. The pump actuating cam 65 is constrained against rotation within the pump barrel as through the agency of a guide pin 70 operating in a guide recess 71.

Supply of oil or other hydraulic fluid for the spindle stroke indexing means may be provided through a passage 72 communicating with a fluid reservoir 73 and opening into the space 74 in the pump barrel behind the plunger 63.

A fluid passage 75 is provided through the pump plunger 63 for communication between the space 74 and a forward chamber 76 located within a cylindrical body portion 77 concentric with the pump chamber 64. Beyond the chamber 76 I provide a check valve 78, adjacent which is provided a check valve follower 79 located in a chamber 79a. A check valve spring 80 is provided biasing the check valve 78 towards closed position and reacting against the check valve follower 79. Beyond the check valve follower 79 I provide a check valve 81 located at the discharge passage portion 82 of the pump and provided with a valve spring 83 which is preferably made somewhat stronger than the valve spring 80. The forward end of the plunger 63 is provided with a valve lift member located within the chamber 76, and fluid passages are provided between the chamber 79a and the pump chamber 64 as at 85. The pump plunger is provided with a return spring 86 adapted to bias it outwardly or rearwardly into engagement with the actuating cam 65.

The discharge passage 82 communicates with the fluid supply passage 21 which communicates with the expansion cylinder 15 for the spindle 4. Operation of the cam 23 and actuation of the plunger 22a of the pump 22 will provide the desired stroke for the spindle 4, upon rotation of the cam shaft 24, and operation of the lever 69 will serve to supply an additional quantity of fluid to the chamber 15 in order to provide an indexing of the position of the spindle 4 in starting the stroke effected by operation of the pump 22. Rotation of the handle 69 will cause a rotation of the pump operating cam 66 which forces the pump actuating cam 65 forwardly. This forces the plunger 63 against the biasing action of the spring 86, compressing the fluid within the pump chamber 64 through the opening 85 thence past the check valve follower 79, lifting the check valve 81 from its seat and forcing fluid through the passage 82 into the passage 21 thence into the expansion cylinder 15. A suitable dial indicator may be provided as at 59, operatively associated with the spindle 4 to indicate the actual position of the spindle longitudinally within the bore 3. Any suitable type of micrometer dial indicator may be provided, such as a plunger actuated type known to the art, and the operator may index the position of the spindle 4 by pumping on the handle 69 until the desired starting position is located. In order to allow fluid to escape from the chamber 16 under the action of the retracting spring 9, to withdraw the spindle 4 further into the spindle bore 3, the construction is preferably so arranged that the handle 69 may be rotated approximately 90° to produce the maximum forward movement of the pump actuating cam 65, forcing the pump plunger and its associated valve lift member 84 forwardly into contact with the ball of the first check valve 78, opening the valve member formed thereby, and the valve ball will be pushed forwardly against the valve follower 79 which in turn will push the ball of the valve 81 from its seat, opening both check valves and allowing fluid to pass from the chamber 15 through the passage 21 into the passage 82 thence outwardly of the pump through passage 75 into the communicating passage 72 to the reservoir 73. The operator may stop the retraction of the spindle at any time by returning the handle 69 towards the normal position shown in Fig. 6, interrupting the fluid return.

Figures 6, 7, 7A:
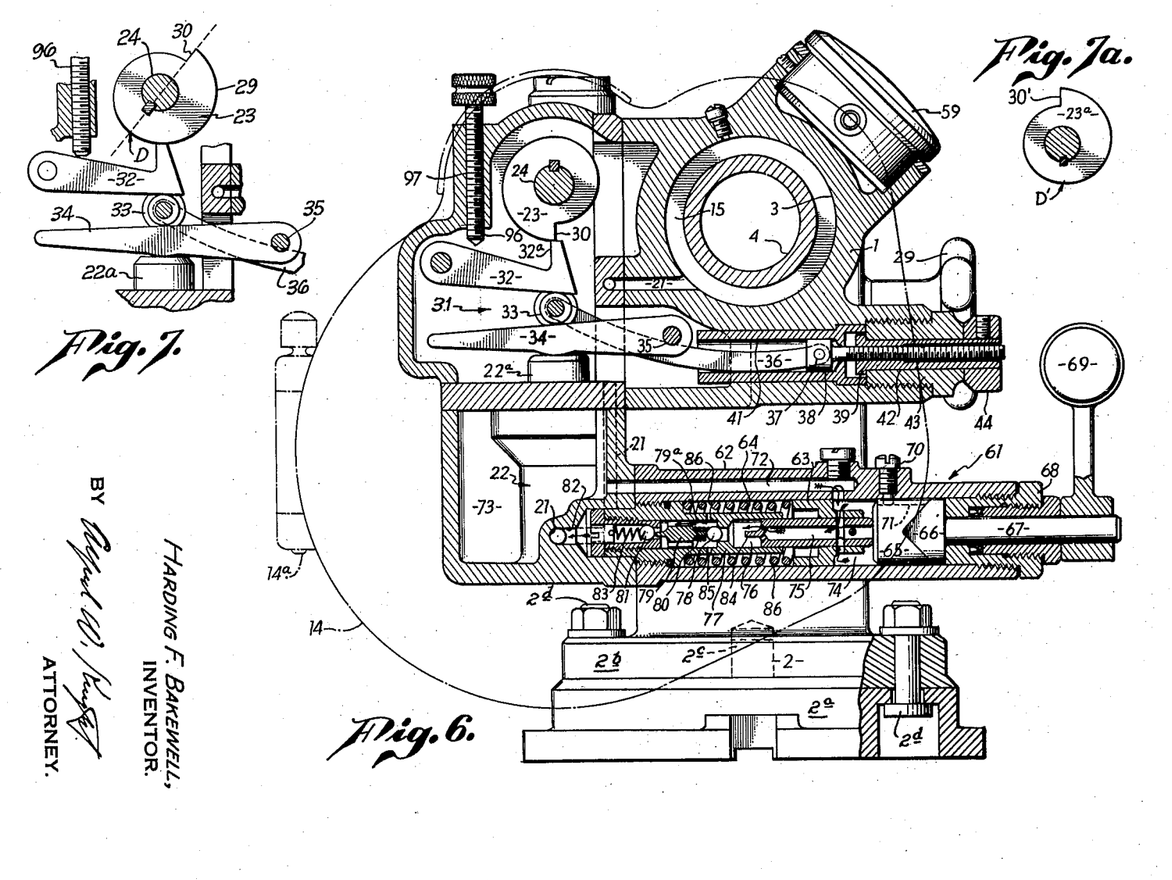
Fig. 6 is a transverse sectional view, as taken on line 6—6 in Fig. 1, showing the hydraulic actuating means.
Fig. 7 is a fragmentary detail illustrating a limit-motion member which may be provided for the fluid supply pump member which effects the above-described translatory relative movement.
Fig. 7a is an alternative form of cam member which may be employed to drive the fluid-supply pump member if desired.
Figure 8:
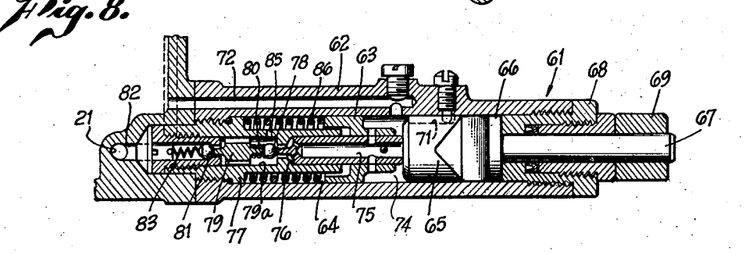
Fig. 8 is a fragmentary view corresponding to the lower portion of Fig. 6, showing an operational position differing from that of Fig. 6.

Having established the desired position for the spindle 4, the operator may then establish the desired stroke for the spindle through operation of the adjusting knob 44, which through the link 36 will position the connecting idler 33 and thereby control the stroke of the plunger 22a which will be effected in one revolution of the pump operating cam 23. The position of the various parts 32 through 44 of the stroke control means as shown in Fig. 6 represents the maximum stroke that can be secured with a given cam 23, and movement of the connecting idler 33 toward the left in Fig. 6 will progressively reduce the stroke, as will be apparent. The operator may constantly observe the dial indicator 59 during operation of the device to make sure that the desired stroke and index is preserved for a given operation. The passage 21 between the pump 22 and the expansion cylinder 15 is entirely free of any valve members, wherefore circulation of fluid within passage is unrestricted. This insures that the position of the spindle 4 is entirely a function of the position of the pump plunger 22a within the pump 22, and the stroke of the spindle which may be obtained is limited only by the relative capacities of the expansion cylinder 15 and the pump 22 as controlled by the operation of the plunger 22a under the influence of a given cam 23.

Figures 9, 10, 11, 12:
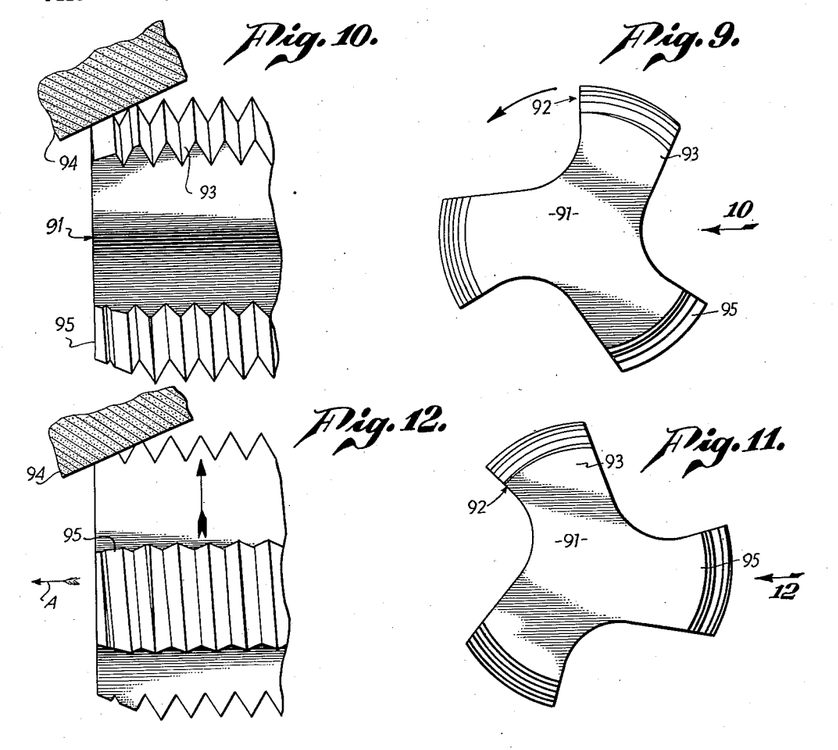
Fig. 9 is an end view of a three-flute tap.
Fig. 10 is a side view of the end portion thereof, taken in the direction indicated by the arrow 10 in Fig. 9, showing a grinding element in position to start a grinding operation.
Fig. 11 is a view corresponding to Fig. 9, showing the tap rotated through an angle corresponding to the peripheral length of a land on the tap.
Fig. 12 is a view corresponding to Fig. 10, taken in the direction indicated by the arrow 12 in Fig. 11.

In connection with the operation of the grinding fixture of this invention, I have illustrated a grinding operation on a three flute tap indicated at 91 in Figs. 9 through 13. In grinding a three flute tap a gear ratio of 3 to 1 will be established between cam shaft 24 and the spindle 4. One rotation of the cam shaft 24 will thus produce a stroke of the spindle 4, which carries with it the tap 91 in this example. The index starting position of the tip or point of the tap 91, as determined by operation of the spindle stroke indexing means 61 above described, is illustrated in Figs. 9 and 10. In these figures the extreme forward edge or cutting edge 92 of a tap land 93 is shown in contact with a rotating abrasive or grinding wheel 94. If the spindle 4 were, in this position, rotated without any forward or translatory motion being imparted thereto, the grinding wheel would cut a conical surface on a respective land of the tap (the showing in Fig. 9 being that of such a conical chamfer), and no clearance would be provided and hence no cutting would take place if the tap were used in a thread-cutting operation. According to the use of the device of this invention the operator will in advance determine the amount of clearance required rearwardly of the cutting edge 92 on the land 93, and will adjust the variable stroke and link assembly 31 in consonance therewith. Inasmuch as it would not be feasible to feed the spindle forwardly throughout a complete revolution of the cam shaft 24 without causing the succeeding leading edge of the succeeding land 95 to be engaged by the grinding wheel 94 when the tap was advanced in conformity with the degree of clearance or clearance angle established for the point of the tap, it is desirable that the cam 23 and the associated mechanism be so arranged as to cause the tap to be advanced throughout the portion of its revolution during which the abrasive wheel 94 will be in contact with the land, and to then retract the spindle and the tap during the balance of the revolution portion before which a succeeding land 95 is brought into position to be operated upon by the abrasive wheel 94. This may be accomplished in any one of several manners, and in Figs. 7 and 7a I have illustrated two constructions which provide this type of operation. In Figs. 6 and 7 I have shown a stop screw 96 threadedly disposed in the rear gear case 13 as at 97, in position to engage the cam follower 32 and limit its upward movement. With a vertical adjustment of the screw 96 as shown in Figs. 6 and 7, the upward movement of the cam follower 32 is such that it will contact the cam 23 only throughout the second one-half of the revolution of that cam. The cam 23 in Fig. 7 is adapted to be rotated in a clockwise direction during operation, and the cam surface 29 is shown as an expanding spiral. The point D on the cam surface opposite the end 30 of the cam would be contacted by the cam follower 32 during rotation of the cam, and the position D would be the position corresponding to the indexing of the translatory movement of the spindle 4 and the associated tap 91 as shown in Figs. 9 and 10. Further rotation of the handle 28, rotating the cam shaft 24 and the cam 23 will force the cam follower downwardly, operating the pump plunger 22 and advancing the spindle 4 within the bore 3. In a three flute tap as shown at 91 the leading edges of the lands should necessarily be 120° apart, and with the described gear ratio, a full rotation of the cam 23 (Fig. 7) will take place during this 120° rotation of the tap 91. During the first 180° of rotation of the cam shaft 24, starting it with the point D immediately above the cam follower 32, the desired translatory movement of the tap 91 is secured. In Figs. 11 and 12 I have shown the position of the tap when it has been rotated the full peripheral length of the land 93, bringing the grinding wheel 94 in position such that it contacts the trailing edge of the thread forming teeth. During this rotation the tap has been advanced slightly, in the direction shown by the arrow A in Fig. 12, an amount dependent upon the amount of clearance desired according to the particular tap involved. The amount of clearance may be visualized by comparing the appearance of the surface of the tap in Figs. 9 and 11 at the portions where the land is in contact with the grinding wheel 94. When the tap has been rotated slightly past the position shown in Figs. 11 and 12, the end 30 of the cam 23 will pass the cam follower 32, allowing the pump plunger 22a to be pushed outwardly of the pump 22 under the influence of the pump plunger operating spring 22b (Fig. 4), permitting escape of the hydraulic operating fluid from the expansion cylinder 15 under the influence of the retracting spring 9. The spindle 4 will thus retract, withdrawing the tap from contact with the grinding wheel 94. The retracted position of the spindle 4 will be determined by the engagement of the cam follower 32 at the end of the stop screw 96, and further forward translatory movement of the spindle will not take place until the cam 23 has been rotated so that the point D thereof will again be in contact with the cam follower. Successive rotation of the cam shaft 24 through the agency of the handle 28 will effect the grinding operation of the successive lands of the tap, and when all of the lands have been ground the operation is complete. It will be appreciated that after grinding all the lands to the same degree, the operator may operate the spindle stroke indexing means 61 to advance the starting point of the tap 1/1000 inch or so, and a finish grind may be taken on the tap, if desired. With the use of a stop screw of the character shown at 96, the proportion of the rotation of the cam which is utilized in producing a forward stroke of the spindle may be adjusted to substantially any degree. Inasmuch, however, as it is usual that the flutes in a tap are of somewhat longer circumferential length than the lands, it may be convenient to provide a cam 23 of the type indicated at 23a in Fig. 7a. This cam is cylindrical throughout the first half of its surface, from the cam end 30′ to the point D′ 180° around, and then is of expanding spiral form from the point D' around to the cam end.

It will further be appreciated that the amount of chamfer which is provide will be governed by the angle between the face of the grinding wheel 94 and the axis of the tool being operated on, and for this reason the base 2 of the frame means provided for the device may be rotatably disposed upon the supporting means, according to ordinary practice, if desired. One possible construction for this purpose is shown in Fig. 6. The base 2 comprises two parts, a lower section 2a adapted to be bolted or otherwise affixed to a bench or similar working surface, and an upper section 2b supported by and rotatably mounted on the lower section by a pivot pin 2c on the lower section that projects upwardly into a centrally disposed bore in the upper section 2b. The two sections 2a and 2b of the base are held in an adjusted position by clamp bolts 2a passing through bores in the upper section and having enlarged heads which are movable in arcuate races in the lower section, as shown, in a manner widely used in vises and other bench-mounted tools.

Figure 13:
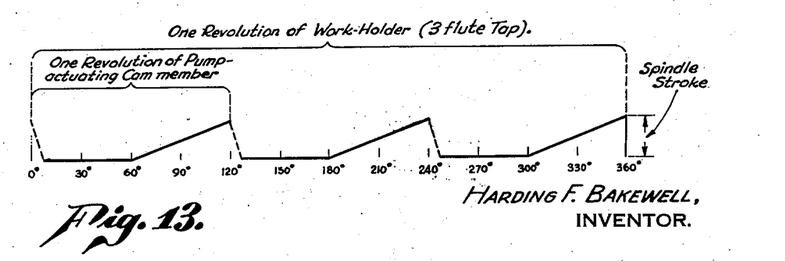
Fig. 13 is a graphical representation of the relation between the translatory and rotational movements effected by the device during the grinding operation upon a tap of the character shown in Figs. 9–12.

In Fig. 13 I have graphically illustrated the relative translatory and rotational movement of the work-holder as the cam shaft 24 is rotated. In this figure the initiation of the operation (0° rotation of the spindle) is considered to be so indexed as to occur just as the cam follower 32 falls off the end 30 of the cam 23 (a very slight rotation of the cam 23 from the position of Fig. 6). During the first 60° rotation of the spindle 4 (180° rotation of the crank handle 28) the spindle remains longitudinally at rest, until the point D on the cam 23 engages the cam follower. From the 60° to the 120° rotation sector the cam 23 is pushing the cam follower down, forcing fluid into the expansion cylinder 15 and producing a translatory movement in the work-holder. During all or a part of this 60° of rotation the grinding element will be in grinding contact with the tool, and when the cam follower falls off the end of the cam at the 120° position (completing one full rotation of the cam shaft 24) the operation is ready to be repeated.

After completion of the chamfered surface in the end of the trap, as above described, the device may be used to index the successive cutting edges at a precise angular spacing. This may be done by employing a grinding wheel which will enter the tap flute to grind along the face of the land 93 as shown by the arrow 92 in Fig. 9, using the cam 23 and follower 32 to establish the rotative position of the spindle and the work. For example, the cam 23 may be rotated clockwise until the cam follower falls off the cam end 30, and then rotated counterclockwise to cause the radial face of the cam end to engage the near edge 32a of the cam follower, after which the spindle 4 may be grasped manually at the chuck 5 and rotated sufficiently to remove any play from the gear train 51, 52, etc. The spindle may then be locked with respect to the frame 1 by turning the knob 29 associated with a convenient locking means (not shown). The grinding element may now be caused to move axially of the device (it being assumed that the grinding element is mounted on movable means which provide a traversing movement) to grind along the cutting edge 92. After this grinding stroke, the lock 29 is loosened, the handle 28 rotated once and the operation repeated. This places the second cutting edge exactly 120° from the first cutting edge which was dressed. Similarly, the third cutting edge will be dressed, and the finished tool will have three cutting edges indexed 120° apart, with exactly the same chamfer on each land, so that each cutting edge performs exactly as its neighbor and the tool will function efficiently.

Figure 14:
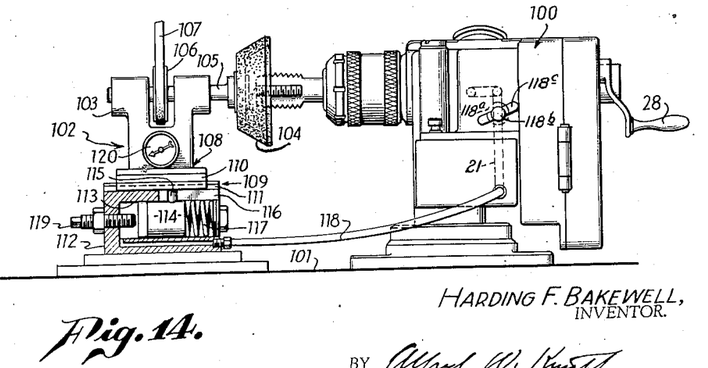
Fig. 14 is a side elevation of a modified form of the invention, showing a tap in position to be ground.

It will further be appreciated that it is not essential that the translatory movement be produced on the spindle 4. In Fig. 14 I have illustrated a modification of the invention, in which the translatory movement is produced in the grinding device which is provided to perform the function indicated in Figs. 10 and 12 by the reference numeral 94. Referring to this figure, a grinding fixture is shown at 100, which may comprise a construction of the type shown hereinabove, which is mounted on a base or a table 101 in spaced relation to a grinder assembly 102 which may comprise a support 103 carrying a cup grinding wheel 104 mounted on a grinder shaft 105 provided with a pulley 106 driven by a suitable belt 107. The support 103 may be pivotally mounted as at 108 on a traverse ways 109 comprising an upper movable dove-tail slide 110 secured to the support 103 and a fixed dove-tail slide 111 formed in a base 112 mounted on the table 101. Within the base 112 I provide a cylinder 113 having a piston 114 slidably mounted therein and connected to the movable dove-tail slide 110 through the agency of a connecting arm 115 extending through a slot 116 provided in the fixed dove-tail member 111. A retracting spring 117 is provided to bias the piston 114 against the action of the actuating fluid supplied through a fluid conduit 118 which may communicate with the passage 21 in the grinding fixture 100. A limit screw may be provided for the piston 114, as at 119, if desired.

In order to utilize the expanding pump 22 to operate the piston 114 within the cylinder 113 through the conduit 118, it is merely necessary to connect the conduit 118 to the passage 21, as above described, and to provide a suitable valve member in the passage 21 between the point of connection of the conduit 118 and the expansion cylinder 15. As typical of the various types of valves that may be used, I show in Fig. 14 a simple plug type of manually operated valve placed in passage 21. The valve comprises a plug 118a rotatably mounted in the body of tool 100, and having a bore that forms a section of passage 21 when aligned therewith as shown; but when turned 90° or so, the bore is no longer so aligned and the plug blocks passage 21. Plug 118a is provided with a stem 118b that extends outside the body of tool 100 and carries handle 118c by which the plug may be rotated manually between positions opening and closing passage 21. Operation of the handles 28 and 69 as described above in connection with the first form of device will produce the same relative movements as described above, with the exception that the translatory movement is produced with the grinder element instead of by the spindle 4. The rotational movement of the spindle 4 is preserved, and the desired timing of the translatory and rotational movements will be the same as in the first form of device.

Figure 15:
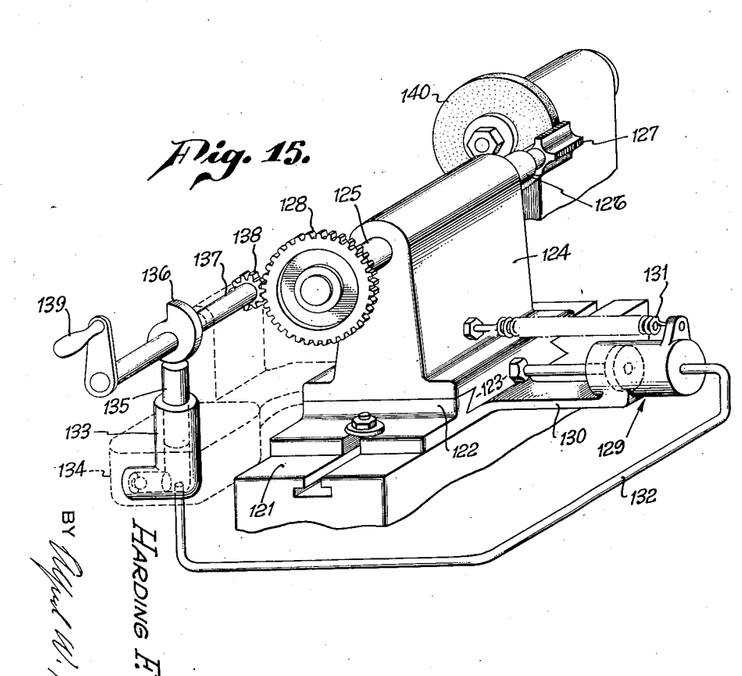
Fig. 15 is an isometric projection of another form of the invention, partly diagrammatic.

It will be further appreciated that the translatory movement effected between the grinding element and the workholder, i. e., the relative translatory movement of these two parts, may be caused to take place transversely of the axis of the work-holder, if desired. This may be accomplished with the form of device shown in Fig. 14 by providing a pivotal mounting for the base 112 of the character described above and shown in Fig. 6 as making base 2 pivotal, so that the axis of the cylinder 113 may be disposed at any desired angle with respect to the axis of the work-holder of the fixture 100, the pivotal mounting 108 for the grinding support 102 making it possible to establish the axis of the grinding wheel 104 at any suitable relation with respect to the axis of the cylinder 113 or the work-holder. In Fig. 15 I have illustrated a modified form of device in which the translatory movement is produced perpendicular to the axis of the work-holder in the work-holder mount itself, the grinding wheel being fixed relative to the base which carries the grinding fixture. The showing in Fig. 15 is somewhat diagrammatic and may comprise a base 121 to which is secured a fixed dove-tail slide 122 mating with a movable dove-tail slide 123 carried by a fixture frame 124. The fixture frame 124 will carry a spindle 125 provided with a work-holder 126 which is shown as carrying a tap 127 in position to be operated upon. The rearward end of the spindle 125 will be provided with a drive gear 128 corresponding to gear 6 above. The lateral translatory movement of the mechanism may be provided through the agency of an actuating cylinder assembly 129 mounted on a side bracket 130 and including a retracting spring 131. A fluid conduit 132 leads to a pump member 133 associated with a fluid reservoir 134 and provided with a pump plunger 135 positioned for engagement by the pump actuating cam 136 mounted on a cam shaft 137. The pump and cam shaft will be carried in a suitable bracket shown generally in dot-dash lines. A cam gear 138 will be provided on the cam shaft 137 for engagement with the spindle gear 128, as in the prior described form of device.

The arrangement of Fig. 15 is shown as positioned for dressing a left-hand tap 127. Rotation of the crank or operating handle 139 in a clockwise direction will cause a translatory movement of the fixture frame 124 to the left as the cam depresses the plunger 135. The gears 138—128 effect a counter-clockwise rotation of the spindle 125 wherefore the translatory movement of the tap 127 will be toward the grinding wheel 140 as the cutting or grinding portion of the revolution of the spindle takes place. The form of cam illustrated in Fig. 7a at 23a may be employed for the cam 136, if desired, so that the desired rotation of the tap from one land to the next land may be secured without causing adverse engagement with the grinding wheel. In order to adapt the device to the dressing of a right-hand tool, it is merely necessary to remove the cam 136 from the shaft 137, reverse it and replace it on the shaft. A counter-clockwise rotation of the operating handle 139 would then produce the proper movement at the tool-holder for the directing of a right-hand tool. Alternatively, the grinding wheel may be moved over to operate on the opposite side of the tool 127, in which case the cam 138 could be employed in the position shown in Fig. 15 and the operating handle rotated in a clockwise direction as above described.

Figure 16:
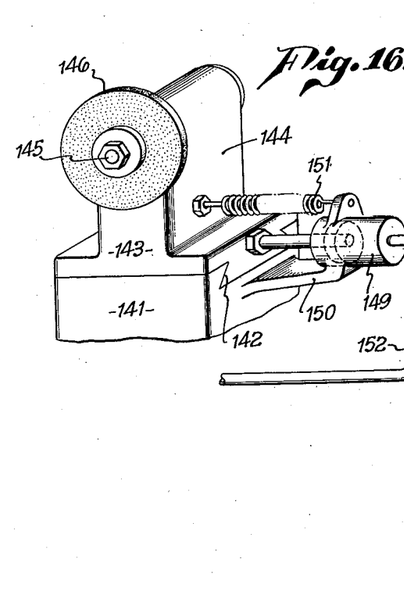
Fig. 16 is an isometric projection of a still further adaptation of the invention.

Fig. 16 shows the actuating cylinder assembly incorporated in the mounting of the grinding wheel rather than the work-holder, as an alternative embodiment of the invention. This construction may comprise a base 141 provided with a fixed dove-tail slide 142 carrying a movable dove-tail slide 143 mounted on a grinding wheel fixture frame 144 carrying a spindle 145 on which a grinding wheel 146 is mounted. The actuating cylinder assembly 149 may be mounted on a side bracket 150 and provided with a retracting spring 151 and a fluid conduit 152 communicating with a pump member corresponding to that shown at 133. The operation of this form of the device will be apparent.

It will be appreciated that for the proper realization of the advantages offered by the device of the present invention, the forms shown in Figs. 15 and 16 will preferably be provided with variable stroke means (such as that indicated at 61, for example) and indexing means (such as that indicated at 59, for example). The application of these elements of the construction will be apparent to one skilled in the art, having reference to the description applied to the first form of the invention.

While the above description has been confined substantially to the grinding of tools of the character of thread-cutting taps, it will be appreciated that the device is equally useful in dressing or grinding other types of tools, such as reamers, drills, milling cutters and the like. One skilled in the art will appreciate the necessary alinement of the grinding wheel with which the device is associated, as well as the particular shape of grinding wheel which will be most useful in a given grinding problem. The device of the present invention not only provides for the production of the desired chamfer, the desired back relief on the cutting edges and the proper indexing of the cutting edges for certain cutting tools such as a tap, but may be used to face the cutting edges of a reamer and index the cutting edges so that all of the cutting edges will perform equally.

I am familiar with the teachings of Patent 2,209,228, issued July 23, 1940, to Franklin Judge, as well as that of certain prior investigators in this art. In its broader aspects, the present invention is concerned with hydraulic motion controlling means in combination with the production of timed translatory and rotational movements applied to the tool or work being operated upon. In its less broad aspects, the invention is concerned with the utilization of stroke-controlling metering means whereby optimum grinding results may readily be obtained under control of the operator of the device.

Many modifications in the construction will occur to those skilled in the art and for this reason I choose not to be limited to the specific details herein described and delineated, but rather to the scope of the subjoined claims.

I claim:

1. Grinding apparatus comprising a rotatable work-holder element for supporting a tool for rotation about the working axis of said tool; a grinding element for operating on said tool; means connected with one of said elements for imparting relative translatory movement to said elements; said means including fluid displacement type actuating cylinder means for producing said translatory movement upon application of fluid pressure; displacement type pump means for producing such fluid pressure; means for controlling the application of such fluid pressure to adjust the translatory movement of said cylinder means in one direction; operating means for said pump means including a rotatable pump-actuating means; an operating member under control of an operator; and means operatively connecting said operating member to said work-holder element and to said pump-actuating means to effect simultaneous rotation of said pump-actuating means and said work-holder element, and thereby effect a predetermined rotative movement of said work-holder element and a simultaneous predetermined intermittent relative translatory movement of said elements toward and into increasing engagement with one another.

2. A construction as set forth in claim 1, and comprising in addition, a second fluid displacement pump means in fluid communication with said actuating cylinder means and under control of the operator independently of said operating member, whereby a measured quantity of fluid may be delivered to said actuating cylinder to effect a translatory index positioning of said one element with respect to the other of said elements independent of the translatory movement imposed by actuation of the first-named pump means.

3. A construction as set forth in claim 1, said controlling means including stroke-control means under the control of said operator for controlling the amount of translatory movement of said one element in response to a given operative movement of said pump-actuating means by said operating member, and mechanically relating said pump means with said pump-actuating means, to vary the fluid displacement of said pump means for a given amount of rotation of said pump-actuating means.

4. Grinding apparatus which comprises: a work-holder element mounted for rotation about a given axis; a grinding element; supporting means for one of said elements for effecting translatory movement of said one element toward and away from the other of said elements, to bring said grinding element and the work carried by said work-holder element into and out of engagement with one another and including fluid displacement type actuating cylinder means adapted to produce such translatory movement in one direction to bring said one element toward the other of said elements upon application of fluid pressure and spring means opposing said cylinder means to produce such translatory movement in the opposite direction to move said one element away from the other of said elements; displacement type pump means communicating with said cylinder means for producing such fluid pressure; operating means for said pump means including a rotatable pump-actuating cam means; and an operating member under control of an operator; means operatively connecting said operating member to said work-holder element and to said cam means to effect concurrent rotation of said cam means and said work-holder element, whereby the rotation of said work-holder element and said relative translatory movement are effected in timed relation to one another to cause said one element to be translated toward and away from the other of said elements to cause the work carried by said work-holder element to be brought into and out of engagement with said grinding element during a predetermined rotative movement of said work-holder element.

5. A construction as set forth in claim 4, and comprising in addition, a second fluid displacement pump means in fluid communication with said actuating cylinder means and under control of the operator independently of said operating member, whereby a measured quantity of fluid may be delivered to said actuating cylinder to effect a translatory index positioning of said one element with respect to the other of said elements independent of the translatory movement imposed by actuation of the first-named pump means.

6. A construction as set forth in claim 4, and comprising in addition, stroke-control means under the control of said operator for controlling the amount of translatory movement of said one element in response to a given operative movement of said pump-actuating cam means by said operating member, and mechanically relating said pump means with said cam means, and said stroke-control means to vary the fluid displacement of said pump means for a given amount of rotation of said cam means.

7. Grinding apparatus which comprises: a work-holder element mounted for rotation about a given axis and for translatory movement; a grinding element; fluid displacement type actuating cylinder means associated with said work-holder element for effecting a translatory movement thereof in one direction to bring the work carried by said work-holder element into contact with said grinding element upon application of fluid pressure; spring means opposing said actuating cylinder means to cause translatory movement of said work-holder in the opposite direction to move the work carried by said work-holder element away from said grinding element upon release of such fluid pressure; displacement type pump means communicating with said actuating cylinder means for producing such fluid pressure; operating means for said pump means including a rotatable pump-actuating cam means; and an operating member under control of an operator; means operatively connecting said operating member to said work-holder element and to said cam means to effect concurrent rotation of said cam means and said work-holder element, whereby the rotation of said work-holder element and said relative translatory movement may be effected in timed relation to one another to cause the work carried by said work-holder element to be translated into and out of engagement with said grinding element during a predetermined rotative movement of said work-holder element.

8. The construction set forth in claim 7, including means for directing the translatory movement of said work-holder element as a longitudinal movement along said given axis.

9. A construction as set forth in claim 7, and comprising in addition, a second fluid displacement pump means in fluid communication with said actuating cylinder means and under control of the operator independently of said operating member, whereby a measured quantity of fluid may be delivered to said actuating cylinder to effect a translatory index positioning of said one element with respect to the other of said elements independent of the translatory movement imposed by actuation of the first-named pump means.

10. The construction set forth in claim 7, the mounting of said work-holder element being such that the translatory movement effected therein is a longitudinal movement along said given axis, and comprising in addition, a second fluid displacement pump means in fluid communication with said actuating cylinder means and under control of the operator independently of said operating member, whereby a measured quantity of fluid may be delivered to said actuating cylinder to effect a translatory index positioning of said one element with respect to the other of said elements independent of the translatory movement imposed by actuation of the first-named pump means.

11. A construction as set forth in claim 7, and comprising in addition, stroke-control means under the control of said operator for controlling the amount of translatory movement of said one element in response to a given operative movement of said pump-actuating cam means by said operating member, and mechanically relating said pump means with said cam means, to vary the fluid displacement of said pump means for a given amount of rotation of said cam means.

12. Grinding apparatus which comprises: a work-holder element mounted for rotation about a given axis; a grinding element; supporting means for one of said elements for effecting translatory movement of said one element relative to the other of said elements to bring said grinding element and the work carried by said work-holder element toward and into increasing engagement with one another, and including fluid displacement type actuating cylinder means adapted to produce such translatory movement upon application of fluid pressure; displacement type pump means for producing such fluid pressure; operating means for said pump means including a rotatable pump-actuating cam means; an operating member under control of an operator; means operatively connecting said operating member to said work-holder element and to said cam means to effect concurrent rotation of said cam means and said work-holder element, whereby the rotation of said work-holder element and said relative translatory movement may be effected in timed relation to one another to cause the work carried by said work-holder element to be translated into and out of engagement with said grinding element during a predetermined rotative movement of said work-holder element; a second fluid displacement pump means in fluid communication with said actuating cylinder means and under control of the operator independently of said operating member, whereby a measured quantity of fluid may be delivered to said actuating cylinder to effect a translatory index positioning of said one element with respect to the other of said elements independent of the translatory movement imposed by actuation of the first-named pump means; and stroke-control means under the control of said operator for controlling the amount of translatory movement of said one element in response to a given operative movement of said pump-actuating cam means by said operating member, and mechanically relating said first-named pump means with said cam means, and said stroke-control means being adapted to vary the fluid displacement of said pump means for a given amount of rotation of said cam means.

13. The construction set forth in claim 12, said work-holder element comprising the movable one of said elements.

14. The construction set forth in claim 12, said work-holder element comprising the movable one of said elements, and the mounting of said work-holder element including means directing the translatory movement effected therein as a longitudinal movement along said given axis.

15. Grinding apparatus comprising a rotatable work-holder element for supporting a tool for rotation about the working axis of said tool; a grinding element for operating on said tool; means connected with one of said elements for imparting relative translatory movement to said elements; said means including fluid displacement type actuating cylinder means for producing said translatory movement upon application of fluid pressure; displacement type pump means for producing such fluid pressure; means for controlling the application of such fluid pressure to adjust the translatory movement of said cylinder means in one direction; operating means for said pump means including a rotatable pump-actuating cam means; gear means constrained to rotation with said cam means; gear means operatively connected with said first-named gear means and constrained to rotate with said work-holder element, and operating means operatively connected with said gear means and adapted to effect concurrent rotation of said cam means and said work-holder element, whereby the rotation of said work-holder element and said relative translatory movement may be effected in timed relation toward and into increasing engagement with one another to cause the work carried by said work-holder element to be translated into and out of engagement with said grinding element during a predetermined rotative movement of said work-holder element.

16. A fixture adapted for use in the grinding of rotative cutting-edge tools, which comprises: a work-holder mounted for rotation about a given axis; supporting means for said work-holder including guide means mounting said work-holder for sliding translatory movement; spring means normally biasing said work-holder in one direction of such sliding movement; fluid displacement type actuating cylinder means associated with said supporting means to overcome the biasing action of said spring means and produce translatory movement of said work-holder in the direction opposite said one direction upon application of fluid pressure; displacement type pump means for producing such fluid pressure; means for controlling the application of such fluid pressure to adjust the translatory movement of said cylinder means in one direction; operating means for said pump means including a rotatable pump-actuating means; and an operating member under control of an operator, said operating member being operatively connected with both said work-holder and said pump-actuating means and adapted to effect concurrent rotation of said pump-actuating means and said work-holder whereby said work-holder is caused to be translated in said opposite direction a given amount during a given rotative movement thereof.

17. A construction as set forth in claim 16, wherein said operating means includes limit means to disengage said pump means from the rotatable pump-actuating means and thereby restrict the operation of said pump means to but a portion of each rotation of said rotatable pump-actuating means.

18. A construction as set forth in claim 16, wherein said controlling means includes stroke-control means under the control of said operator for controlling the amount of translatory movement of said one element in response to a given operative movement of said pump-actuating means by said operating member, and mechanically relating said pump means with said pump-actuating means, to vary the fluid displacement of said pump means for a given amount of rotation of said pump-actuating means.

19. The construction set forth in claim 16, including means for directing the translatory movement of said work-holder element as a longitudinal movement along said given axis.

20. A construction as set forth in claim 16, said supporting means directing the translatory movement effected in said work-holder in a direction transverse to said axis.

HARDING F. BAKEWELL.

REFERENCES CITED

The following references are of record in the file of this patent:

UNITED STATES PATENTS

| Number | Name | Date |
|---|---|---|
| 1,272,474 | Long | July 16, 1918 |
| 1,633,557 | Morgan | June 21, 1927 |
| 1,731,482 | Ernst et al. | Oct. 15, 1929 |
| 1,736,967 | Fraser | Nov. 26, 1929 |
| 1,904,044 | Guild | Apr. 18, 1933 |
| 2,028,642 | Arter et al. | Jan. 21, 1936 |
| 2,092,721 | Arter | Sept. 7, 1937 |
| 2,294,184 | Johnson | Aug. 25, 1942 |
| 2,333,304 | Ernst et al. | Nov. 2, 1943 |
| 2,395,910 | Schmidt | Mar. 5, 1946 |